United States Patent [19]

Nathoo et al.

[11] Patent Number: 5,093,059
[45] Date of Patent: Mar. 3, 1992

[54] METHOD FOR THE TRANSPORT OF A HOMOGENEOUS MIXTURE OF CHOPPED FIBERS

[75] Inventors: Nazim S. Nathoo, Houston, Tex.; Hans O. Hjertson, Troy, Mich.

[73] Assignees: Shell Oil COmpany, Houston, Tex.; ABB Robotics, Inc., Rochester Hills, Mich.

[21] Appl. No.: 642,941

[22] Filed: Jan. 18, 1991

[51] Int. Cl.$^5$ ............................................. D04H 1/70
[52] U.S. Cl. ..................................... 264/121; 264/517; 425/80.1
[58] Field of Search ............... 264/517, 518, 121; 425/80.1, 82.1, 83.1

[56] References Cited

U.S. PATENT DOCUMENTS

| | | | |
|---|---|---|---|
| 3,073,534 | 1/1963 | Hampshire | 425/80.1 |
| 3,833,698 | 9/1974 | Wiltshire | 264/91 |
| 4,046,492 | 9/1977 | Inglis | 417/197 |
| 4,117,067 | 9/1978 | Charter et al. | 264/119 |
| 4,600,603 | 7/1986 | Mulder | 427/180 |
| 4,927,346 | 5/1990 | Kaiser et al. | 425/81.1 |

FOREIGN PATENT DOCUMENTS 659088 10/1951 United Kingdom .
791976 3/1958 United Kingdom .

OTHER PUBLICATIONS

Article, "Transvectors", pp. 27-40.

Primary Examiner—Mary Lynn Theisen

[57] ABSTRACT

A method and apparatus are disclosed for the transport of a homogeneous mixture of chopped fibers, wherein the fibers remain in a homogeneously mixed condition during their transport from a chopper gun to a workpiece, by use of two transvector apparatus placed in series with a conduit attached therebetween.

3 Claims, 4 Drawing Sheets

METHOD FOR THE TRANSPORT OF A HOMOGENEOUS MIXTURE OF CHOPPED FIBERS

BACKGROUND OF THE INVENTION

1. Field of the Invention

The present invention discloses a method and apparatus for the transport of a homogeneous mixture of (chopped) fibers from a fiber generation source, such as a chopper gun, through a long flexible conduit to a workpiece. The transport apparatus is designed to eliminate nonhomogeneous flow of the fibers even as the conduit is maneuvered, so as to allow even deposition of the fibers on the workpiece.

2. Description of the Prior Art

Various manufacturers of nonwoven fabrics for use in glassfiber/resin composites have developed various apparatus for formation of these nonwoven fabrics or fiber "preforms". Reference for example Great Britain patent specification 659,088 of West Point Manufacturing Company, which teaches the removal of fibers from a fiber source by an air current, the passage of the fibers through a fixed transfer duct to a foraminous fiber-receiving member to form thereon a web of closely matted fibers, and the removal of the web from the member. The apparatus is designed to produce a two-dimensional fabric of constant thickness and width.

Reference also Great Britain Pat. No. 791,976 to Owens Corning Fiberglass Corporation wherein a fixed duct system supplies chopped fibers for their eventual deposition upon a preformed screen.

U.S. Pat. No. 3,833,698 discloses a movable chopper gun and roving cutter positioned within a rotatable preform, so as to allow even or uneven fiber deposition about the surface of the preform.

Reference also U.S. Pat. No. 4,117,067 issued Sept. 26, 1978 to Kenneth F. Charter et al; assignee, Owens Corning Fiberglass Corporation, entitled "High Production Method of Producing Glass Fiber Resin Composites and Articles Produced Thereby". Such an apparatus described in this '067 patent includes a device wherein air flow is introduced as a curtain along the sidewall of an inlet plenum, so as to assist the transport of fibers vertically downward through a fixed transport tube to their collection position. Such an apparatus incorporates a fiber chopper device at its inlet thereof.

Manufacturers of fiber reinforced plastic articles of manufacture continually attempt to improve the directed fiber placement process, wherein a chopper gun is used to generate chopped fibers, the fibers thereafter being deposited upon a workpiece. Boating manufacturers have typically used chopper gun technology during the manual layup or fabrication of boat hulls. Due to the lack of repeatability when the chopper gun is held manually, these manufacturers have attempted to automate the process by use of robotic equipment.

For example, a report entitled "Equipment Development and Feasibility Study of an Automated Preform Manufacturing System" was presented on Nov. 20, 1989 by D. M. Perelli of General Motors Corporation Advanced Engineering Staff, in which were described three different robotic/chopper gun systems, (hereinafter System 1, System 2, and System 3), which were operated to determine the feasibility of a robotic chopper gun system.

Referring now to FIG. 1, the apparatus shown as System 1 was used to produce door panel preforms. These preforms were of acceptable glass densities to meet the specifications for molding operations but the glass thickness was not uniform throughout the door panel preform.

The glass fibers deposited on the screen also exhibited a tendency to form ridges, the ridges being caused during various combinations of chopper fan shape, spray path followed by the robot, and various distances that the chopper gun held away from the preform screen. The System 1 stationary binder spray guns were ineffective in fully wetting out the glass.

Referring now to FIG. 2, the System 2, apparatus was used to produce both door panel and motor side compartment preforms. The System 2 apparatus was capable of spraying-up horizontally-mounted door panel preforms of exceptional uniformity as well as sufficient glass density. Glass fibers discharged from the flexible transport hose in a swirling pattern. This swirl-mixing within the hose made the glass discharge from the hose uniform in density. As a result, the fiber application to the horizontally-mounted door preform was uniform.

The vertical walls of the motor side compartment preform were difficult to spray uniformly, however, since the flexible transport hose had to be bent at the robot wrist to apply glass to the vertical walls of the screen. This bent portion of the hose apparently caused the glass fibers within the hose to stratify or lump together. Not surprisingly, the vertical walls of the finished preform showed signs of ridging. The System 2 assembly also did not offer a high degree of maneuverability due to the bulkiness of the flexible hose, which also made programming difficult, especially for continuous path programming. Movement of the robot wrist was also severely limited.

Referring now to FIG. 3, the System 3 apparatus was used to produce motor side compartment preforms which had correct and uniform glass fiber thickness. The preforms also exhibited the high degree of strength necessary for reaction injection molding, as well as the stiffness and strength needed for typical handling methods.

System 3 incorporates the best characteristics of Systems 1 and 2. Glass sprayed onto the three-dimensional screen was random and uniform across the preformed surface. No ridging was evident along the spray paths followed by the robot. Because the chopper gun could be pointed in any direction without bending the tube, no stratification of the glass fibers was evident in the discharge from the tube. Binder application was very good, and preform saturation was readily achieved. Overspray of glass on an average preform spray-up was less than 2%. This system was more mobile than System No. 2 though it was a bit less mobile than the System No. 1 design due to its added length.

Though System No. 3 performed the best this system as designed would burden the operator with large capital expense requirements, due to the large size of the robot required to lift and move the heavy chopper gun mounted at the end of the robot arm. The weight of the chopper gun held at the end of the robot arm requires an expensive robot having large lift capabilities.

An apparatus therefore need be developed, along with a method of operation, that allows the robotic application of chopped fibers to a workpiece of any orientation, wherein the lift capacity of the robot is minimized, and therefore its expense, by the remote location of the chopper gun away from the end of the arm of the robot. Such a system to be operative must avoid the fiber-clogging problems of System 2.

SUMMARY OF THE INVENTION

The present invention solves the fiber clogging problem by use of two transvector apparatus. One transvector apparatus is located at the inlet end of the hose and draws the fibers from the chopper gun discharge into the inlet end of the hose, and accelerates the fibers toward the outlet end of the hose. Use of this transvector, however, by itself did not solve the fiber clogging problem. A second transvector was tried solely at the discharge end of the hose but the fiber-clogging problem persisted.

The clogging problem was finally solved by use of a first transvector apparatus at the inlet to the hose, in combination with a second transvector apparatus at the discharge end of the hose. The first transvector apparently "pushes" the fibers through the hose, which in combination with the second transvector which "pulls" the fibers through the hose, causes the fibers to flow in a completely homogeneous manner through the tube, with no clogging, even when the tube is bent due to movement of the robot arm. The second transvector is carried by the end of the robot arm such that the arm does not need to support a heavy chopper gun.

The capital expense of the robot is therefore minimized due to the minimum lifting requirements imposed on the robot by the support of the non-cloggable light weight hose and second transvector apparatus.

The operating principles of transvector apparatus may be studied in U.S. Pat. No. 4,046,492 entitled "Air Flow Amplifier", issued Sept. 6, 1977 to L. R Inglis; assignee Vortec Corporation of Cincinnati, Ohio. Specific transvector information may be obtained from sales literature published by Vortec Corporation of 10125 Carver Road, Cincinnati, Ohio 45242.

It is therefore an object of the present invention to provide a fiber transport system from a remotely located chopper gun to a workpiece, by use of a long conduit or tube subject to bends, turns, and movement of the robot arm.

It is a feature of the invention for the fiber transport system to include a first transvector apparatus at the inlet end of a hose, as well as a second transvector apparatus at the outlet end of the hose.

These and other features, objects and advantages of the present invention will become apparent from the following detailed description, wherein references made to the Figures in the accompanying drawings.

DETAILED DESCRIPTION OF THE INVENTION

By way of introduction to the invention set forth in FIGS. 4 through 7, and to compare and contrast the present invention with the D. M. Perelli System 1, 2, and 3 apparatus mentioned earlier, it would be advantageous at this point to more fully describe and label each significant element of the Perelli apparatus of FIGS. 1, 2, and 3.

Figure 1:
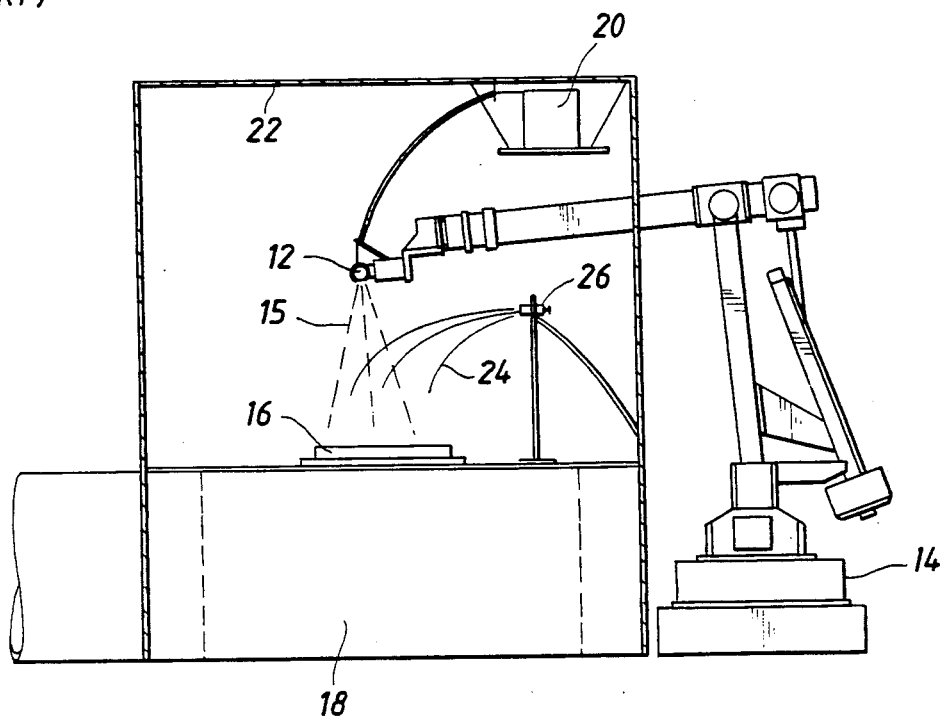
FIG. 1 is a schematic representation in a side view of a robot held chopper gun applying chopped fiberglass to a flat preformed screen.

Referring now to FIG. 1, (System 1), a chopper gun 12 held by robot 14 is shown directing chopped fiberglass fibers 15 towards a flat preformed screen 16 held above an underfloor plenum 18, the gun 12 being supplied by roving 20 held in the top portion of booth 22. Binder 24 is sprayed by spray gun 26 toward the preform screen 16. As mentioned earlier, this system does not operate satisfactorily due to ridging of the fiberglass on the preform screen, as well as uneven deposition of the binder on the fibers 14.

Figure 2:
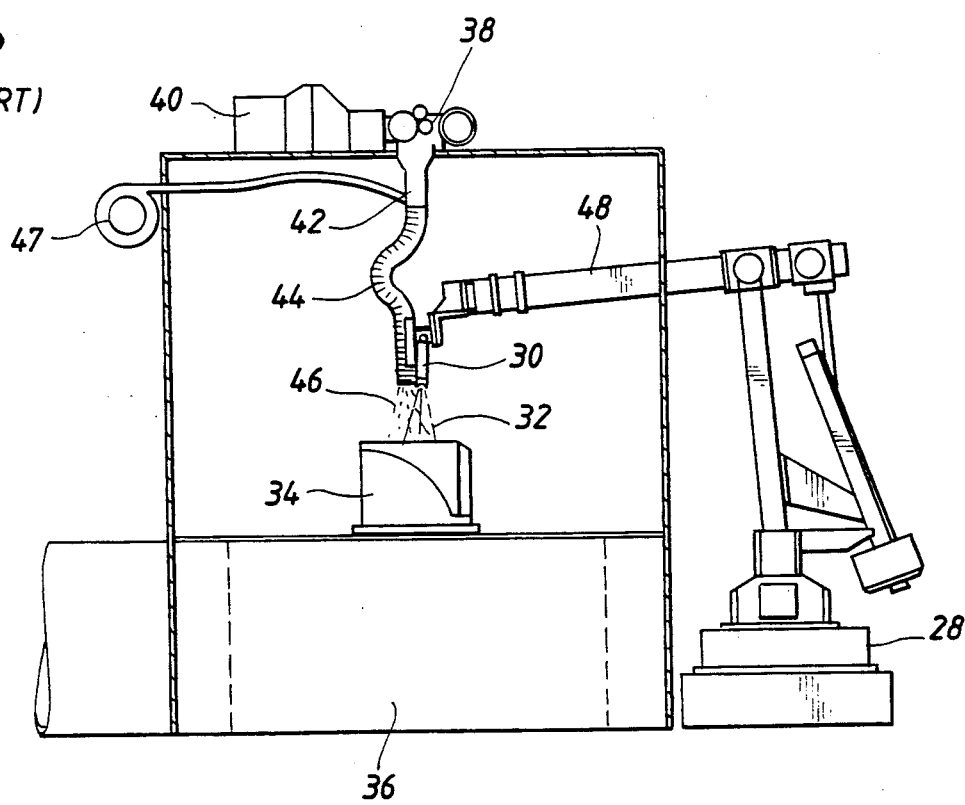
FIG. 2 is a schematic representation in a side view showing a remotely supported chopper gun supplying chopped fiberglass through a hose to a contoured preform screen.

Referring now to FIG. 2, (System 2), a robot 28 is shown holding a binder spray gun 30 which sprays binder 32 on contoured preform screen 34 held above underfloor plenum 36. Remotely mounted chopper gun 38 chops roving 40 and directs the chopped roving down through inductor 42, through hose 44 wherein the chopped fiberglass 46 blends with the binder 32 and is subsequently deposed on the preform screen 34.

The blower 47 provides the motive air whereby the glass fibers get entrained in the air within the inductor and the glass/air mixture is "pushed" through the hose. From time to time, if resistance is encountered to the flow, as when the hose is bent, the back pressure causes part of the air to blow backward through the chopper gun resulting in waste.

Plugging and flow interruptions of the chopped fiberglass 46, with the resultant formation of unacceptable preforms on screen 34, is caused by kinking or bending of the hose 44. System 2 advantageously does not have the relatively heavy chopper gun 38 mounted on the end of the robot arm 48, which permits the use of a smaller capacity robot 28.

Figure 3:
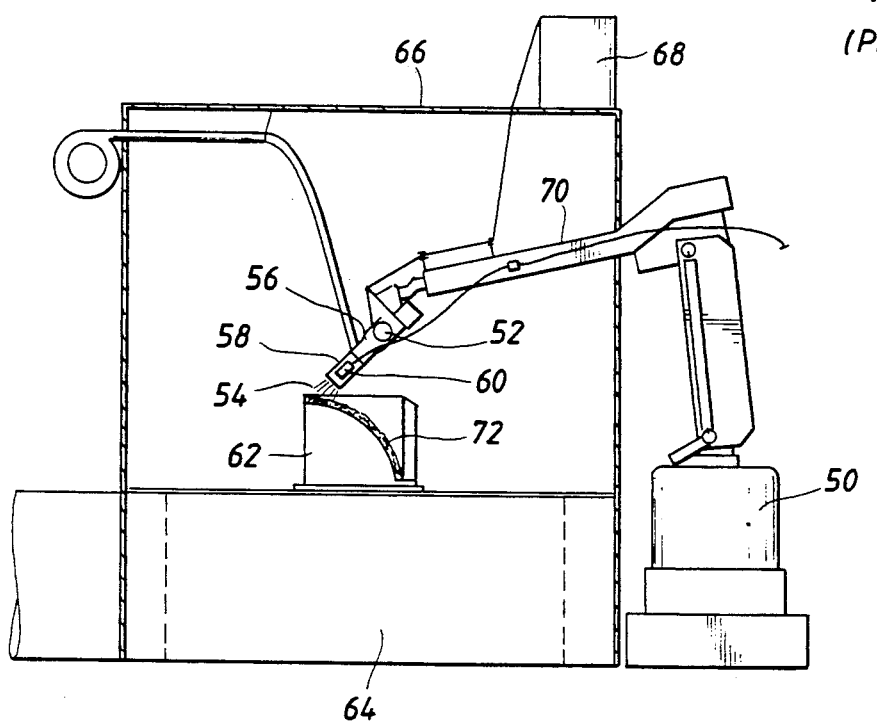
FIG. 3 is a schematic representation in a side view showing a chopper gun supported at the end of a robot arm, delivering chopped fiberglass and binder to a contoured preform screen.

Referring now to FIG. 3, (System 3), robot 50 is shown holding chopper gun 52. The chopper gun supplies chopped fiberglass and binder 54 through the tube 58 and inductor 56, and binder is sprayed from the binder spray gun 60. The chopped fiberglass and binder is directed to the contoured preform screen 62, held above the underfloor plenum 64 of booth 66, the roving 68 being supported by the booth. As mentioned earlier, the robot 50 must support the chopper gun 52 from the robot arm 70, and whereas the resulting preform 72 is acceptable, the capital expense associated with the increased size of robot 50 due to the suspended weight of the chopper gun 52 must be considered as a factor detrimental to the use of such a system.

Figure 4:
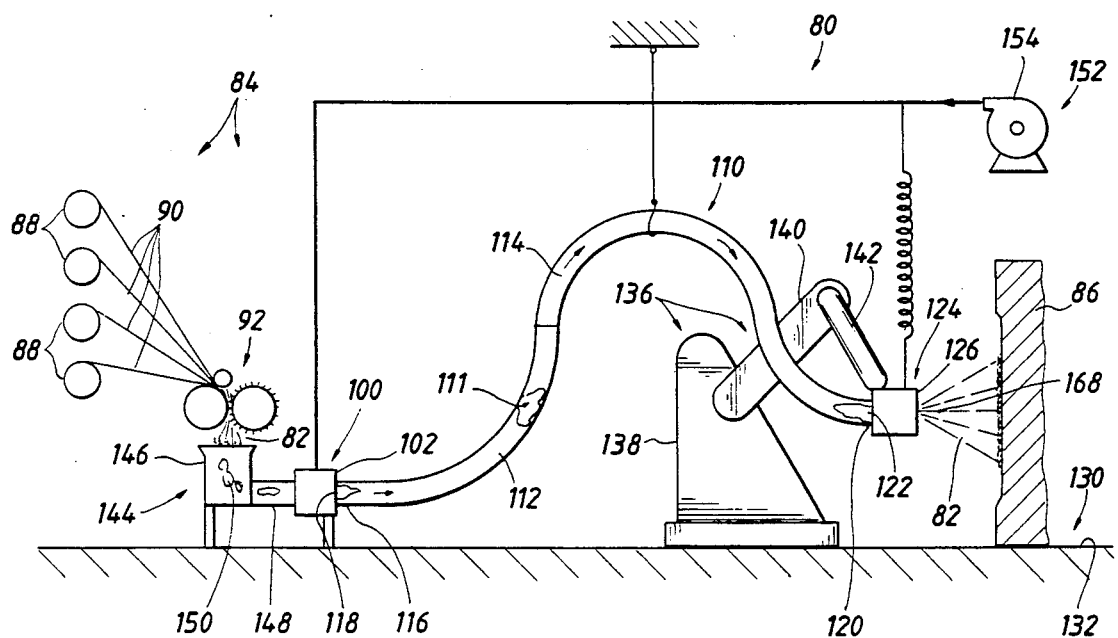
FIG. 4 shows a schematic representation in a side view in partial cross section of the chopped fiber transport apparatus.

Referring now to FIG. 4, the chopped fiber transport apparatus 80 of the present invention is shown, the apparatus 80 being useful for the transport of a homogeneous mixture of chopped fibers 82 from a chopped fiber generation means 84 to a workpiece 86. The chopped fiber generation means 84 in a preferred embodiment would include creels 88 supplying threads 90 to chopper gun 92, as is well known to the art.

Figure 5A:
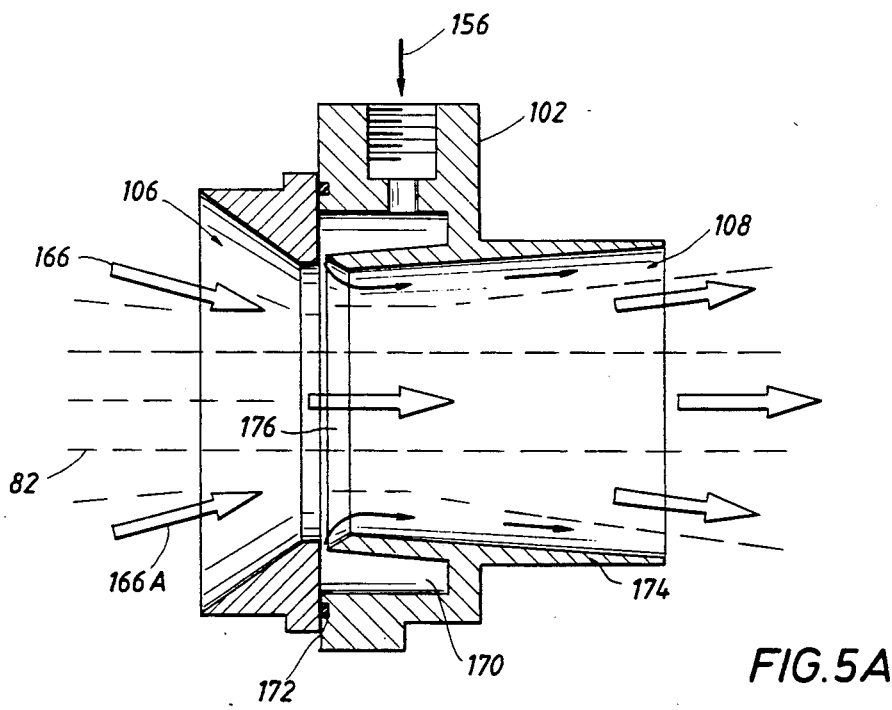
FIG. 5A shows a schematic representation in a side view in cross section of the transvector apparatus located adjacent a chopper gun.

The chopped fiber transport apparatus 80 in a preferred embodiment can be seen to include first flow amplification means 100 comprising a model 914/954 transvector supplied by the Vortec Corporation of 10125 Carver Road, Cincinnati, Ohio, 45242, and labelled as TV1 102, being shown in more detail in FIG. 5A.

Referring now to FIG. 5A the transvector apparatus TV1 102 can be seen to have an inlet opening 106 and an outlet 108 placed in fluid communication with the inlet opening 106, the inlet opening receiving the chopped fibers 82 from the chopped fiber generation means 84, the outlet opening 108 discharging the chopped fibers in an accelerated manner therethrough, as explained in further detail later in the specification. It should be noted that an air blower is not required at the inlet of the inlet opening 106 due to the effectiveness of the transvector TV1 102.

Returning again to FIG. 4, the transport apparatus can also be seen to include conduit means 110 such as in a preferred embodiment fixed hose 112 coupled in a continuous manner with flexible hose 114, though it is well recognized that many other hose or ducting combinations may be used to accomplish the same mechanical result. Conduit means 110 can be seen to have an inlet 116 along with an inlet opening 118 (shown in partial cutaway) as is well known to the art. Conduit means 110 can be seen to include a typical flow opening 111 defined about its entire length therein, (shown in partial cutaway).

Conduit means 110 can also be seen to have an outlet 120 and associated outlet opening 122 (shown in partial cutaway) as is well known to the art, the outlet opening 122 being in fluid communication with the inlet opening, the inlet opening receiving the chopped fibers 82 from the outlet opening 108 of the first flow amplification means, the outlet opening 108 discharging the chopped fibers therethrough.

Figure 5B:
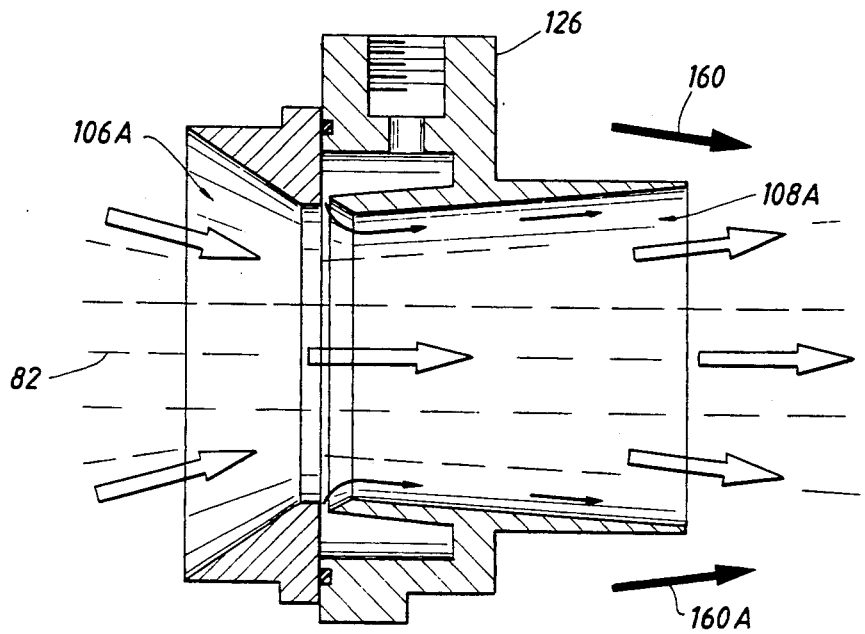
FIG. 5B shows a schematic representation in a side view in cross section of the transvector apparatus located adjacent a workpiece.

Transport apparatus 80 can also be seen to include in a preferred embodiment second flow amplification means 124 such as a transvector similar or identical to the transvector TV1 102, the transvector for the second flow amplification means being labelled TV2 126, and being shown in FIG. 5B. Such second flow amplification means 124 would again have an inlet opening 106A and outlet opening 108A, the outlet opening 108A placed in fluid communication with the inlet opening 106A, the inlet opening 106A receiving chopped fibers 82 from the outlet opening 122 of the conduit means 110 (FIG. 4), the outlet opening 108A of the transvector 126 discharging the fibers 82 in accelerated homogeneous manner therefrom, preferably toward the workpiece.

Returning now to FIG. 4, support means 130 such as floor 132 may be used to support the chopper gun and the first flow amplification means 100.

The apparatus 80 can also be seen to include robotic movement means 136 such as a robot manufactured by Asea Brown Boveri Robotics Incorporated, New Berlin, Wis. In a preferred embodiment the robot 138 being Tralfa model no. TR 5000, generically having arm A 140 and arm B 142 for support of the second flow amplification means 124, the robot 138 capable of moving the second amplification means 124 in at least a one-dimensional manner. The robotic movement means 136 can be seen to be supported by the support means 130, the chopped fiber generation means 84 not being supported by the robotic movement means so as to minimize the required support capacity of the robot 138. This decreases the required lift capacity and also the expense of the robot 138, thereby decreasing the capital requirements of the overall system.

Inlet collection means 144, such as hopper 146, in a preferred embodiment is positioned between the chopper gun and the transvector TV1 102, the hopper having a 50 square inch opening for receipt of the fibers, as well as an 8 square inch funnel 148 opening area leading into the transvector TV1 102 opening 106. Inlet collection means 144 therefore can be seen to have an opening 150 defined therethrough placed in common fluid communication with the chopped fiber generation means and the inlet opening 106 of the first amplification means 100, for the collection of the chopped fibers generated by the chopped fiber generation means, and subsequent funneling of the fibers into the first flow amplification means.

Compressed air supply means 152, such as an air compressor 154 well known to the art, is provided for the supply of compressed air to compressed air openings 156, 156A in the side of the transvector apparatus TV1 102 and TV2 126 respectively.

Referring now to FIGS. 5A and 5B it should be understood that a transvector may be used either ducted, (having a hose connected to the discharge end such as TV1 102), or unducted, (discharging freely to the atmosphere with no hose connected to the discharge end such as TV2 126).

In general air from the compressed air opening 156 enters the small inlet and flows into the plenum chamber 170 surrounding the annular orifice 172. This orifice is only 0.002 inches wide and it represents a restriction to the compressed air. The air is throttled to atmospheric pressure as it passes through the orifice and it attains sonic velocity (1,000 feet per second).

This thin sheet of high velocity air shown by arrow 174 leaving the nozzle is deflected toward the outlet opening 108 by a small lip on the inlet ring, and it moves along the interior surfaces of the transvector and through its throat 176. Particles of fast moving air bump into still particles in the inlet region. This causes the relatively still particles to speed up and the fast particles to slow down. Thus, the primary stream is sacrificing velocity to induce larger amounts of air into the stream from the surroundings. A small suction is created in the nozzle outlet region 108, and an amplified flow moves through the throat 176.

The basic amplification ratio of a transvector is a measure of air amplification in a ducted installation, such as for TV1 102, whereas TV2 126 operates in an unducted manner, not having any conduit affixed to the outlet opening 108A thereof.

A basic amplification ratio of 20:1 in other words is determined by noting that the primary stream of compressed air supplied to compressed 30 air opening 156 will induce (by light suction) 19 times as much air from the surroundings to flow through the device as the amount of compressed air used. The total flow through the transvector TV 102 will be 19 plus 1 or 20 times as much as the compressed air usage.

The Vortec model 914/954 transvector used in the present embodiment has a nominal basic amplification ration of 20:1 though it should be recognized that the volume of compressed air supplied to the first flow amplification means may comprise from about 1/15th to about 1/40th the total air flow through the inlet opening 106 of the first flow amplification means.

An entrainment ratio may be given for the TV2 126 unducted application. This ratio is generally three times greater than the basic amplification ratio because it takes into account the additional entrainment of air surrounding the output stream of an unducted discharge, and is labelled in FIG. 5B by entrained air arrows 160, 160A. The effect of entrainment normally occurs a few feet from the transvector's outlet.

Figure 6:
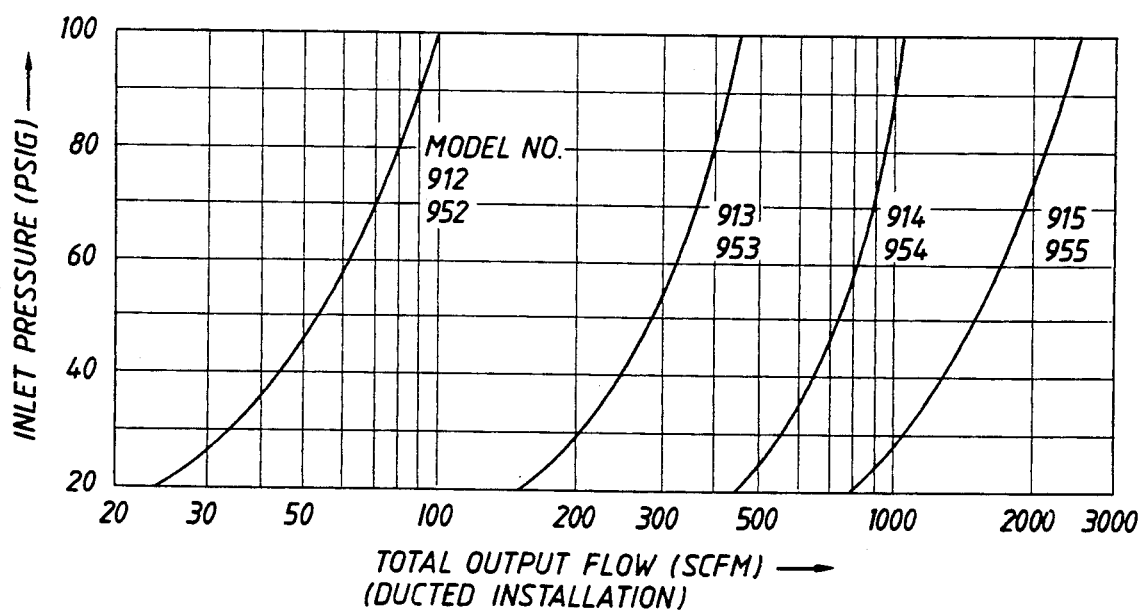
FIG. 6 presents in a graphical manner transvector performance curves.

The performance chart shown in FIG. 6, which uses the basic amplification ratio, shows the total ducted output capacities of the four sizes of transvectors commercially available from the Vortec Corporation. The total flow is the sum of the induced flow (labelled by arrows 166, 166A in FIG. 5A), and the compressed air flow, the two components of the basic amplification ratio. It should be noted for optimum performance, that the resistance of the inlet or outlet ducting should be kept below 2 inches Water Column. Outlet flows decrease at higher resistances.

To determine the compressed air consumption for any model at any pressure, simply divide the total output flow shown in FIG. 6 by the basic amplification ratio. For example, a model 913 delivering 370 cubic feet per minute total output consumes about 19.5 standard cubic foot per minute of compressed air. This is found by dividing 370 by the basic amplification ratio of 19.

Figure 7:
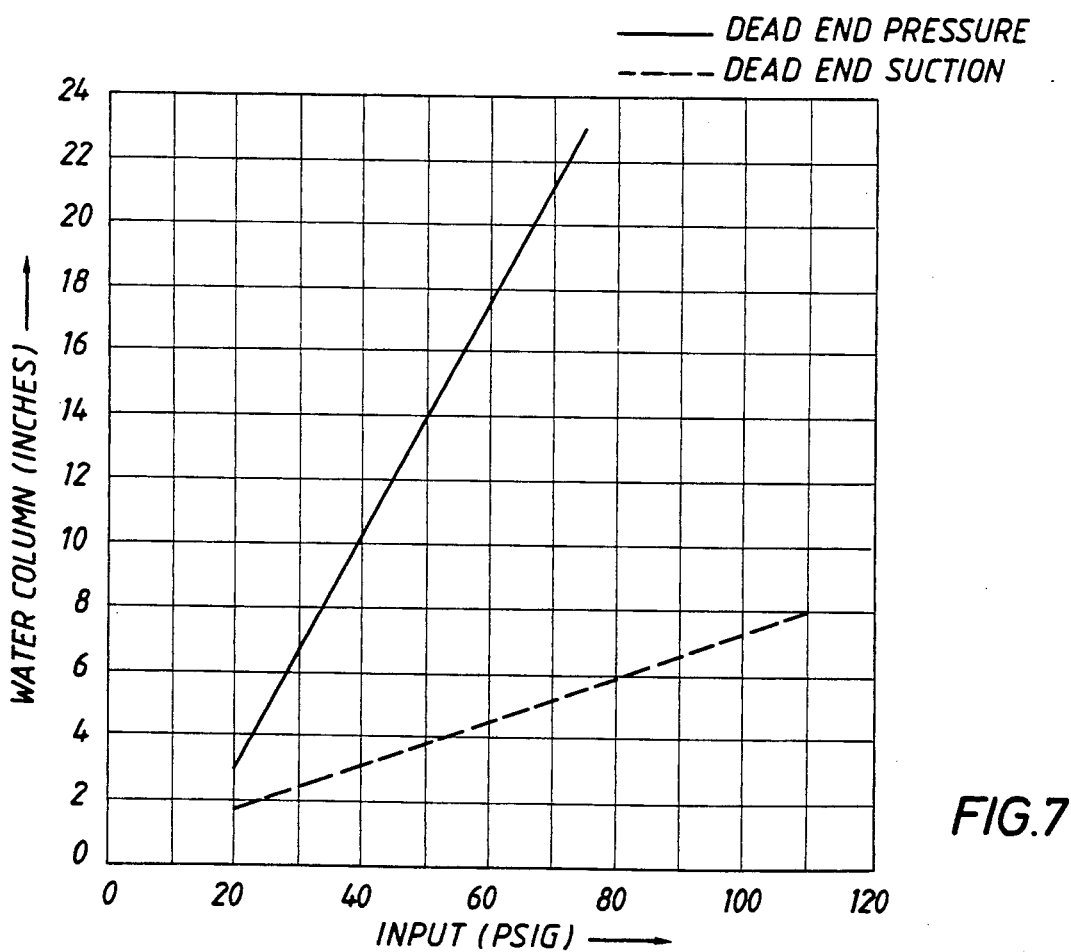
FIG. 7 presents in a graphical manner transvector performance curves for a model 914/954 transvector.

Referring now to FIG. 7 the dead end suction and dead end pressure respectively for the 914/954 transvector may be seen plotted versus inches of water column.

Other principles of operation of the transvector may be explored with personnel of the Vortec Corporation which may be reached by telephone at area code 800-441-7475, or by writing to their address given earlier.

In operation, the first flow amplification means, conduit means, and second flow amplification means are all placed in common fluid communication with one another, as shown in FIG. 4. The fixed hose length in the preferred embodiment from the first flow amplification means toward the robot was approximately 8½ feet, using 4½ inch EMT (OD) steel tubing. The flexible hose length from the end of the fixed hose to TV2 126, was 15 feet, using 4 inch flexible hose available commercially, a small reduction adapter being used between the fixed and flexible hoses.

Compressed air is supplied to the first and second flow amplification means 100, 124, the pressure of the supplied compressed air delivered to TV1 adjusted to be from about 2 to about 4 times the pressure of the compressed air supplied to the TV2 transvector. In a preferred embodiment the compressed air supply pressure to TV1 was established at 46 psi, whereas the compressed air supplied to TV2 was set at 15 psi by use of appropriate upstream regulators (not shown). The basic amplification ratio for the ducted TV1 transvector, (Vortec model 914/954) is 20:1, with a ducted output of 440 to 1,000 standard cubic foot per minute. The entrainment ratio for the unducted TV2 transvector is 60:1.

Once the compressed air flow is established through the transvectors, the chopper gun is started, and the chopped fibers flow from the gun sequentially through the first flow amplification means, conduit means, and second flow amplification means, the chopped fibers thereafter flowing in an accelerated homogeneous manner from the outlet of the second flow amplification means toward the workpiece 86. Inlet collection means 144 may be used to funnel the fibers into TV1.

In an illustrative embodiment of the invention PPG Industries thread, type number 5540, was used to feed the chopper gun. Each thread 90 (FIG. 4) flowed from its respective creel at 425 feet per minute or 0.67 pounds per minute, 4 strands of threads 90 being used simultaneously, yielding a total thread usage rate of 1700 feet per minute, or 2.68 pounds per minute of chopped fibers leaving the fiber generation means 84. The average length of the fibers 82 after exit from the chopper gun 92 was 1.5 inches.

The chopper gun 92 was manufactured by Finn and Fram Corporation and has a maximum motor speed of 850 rpm, wherein the speed control was set at 65%.

The workpiece 86 comprises a screen having an airflow such that a face air velocity of about 11 ft/sec is maintained through the screen holes even as the glass deposit is built up. The screen typically has ⅛" diameter holes spaced so as to give the screen an open area of about 80%.

The air velocity at point V 168, (FIG. 4) being located 2 inches from the center of discharge of TV2, was measured at approximately 4800 feet per minute. It should be noted that the exact velocity was difficult to measure; instantaneous readings varied from 4200 to 5500 feet per minute.

Once chopped fiber flow has been established through the transport apparatus 80 robot 138 may thereafter move arms 140, 142 so as to deposit the correct thickness, width, and depth of fibers 82 on various areas of workpiece 86. In the preferred embodiment the chopped fibers were deposited to a depth of from about ¼" to about ⅜" on the workpiece.

It should be well understood that the above transport apparatus may be modified to transport fibers over greater lengths, such as by addition of further transvectors and additional lengths of hose. One possible system would include an additional transvector evenly spaced between TV1 and TV2 along with another 20' length of hose.

It should also be well understood that other flow amplification devices such as a Coanda airmover, venturi, or ejector apparatus may be used in place of, or in combination with the transvector apparatus, in order to achieve the same mechanical result of homogeneous fiber delivery from a chopper gun to a workpiece, depending on the desired flowrates and fiber characteristics that may be encountered. Interpretation of the phrase "flow amplification means" should not be limited to the transvector apparatus of Vortec Corporation. Additionally, although the above discussion relates to the use of air as a carrying medium for the fibers, it should be well understood that water may also be used to carry the fibers to a (submerged) workpiece, the flow amplification means being capable of amplifying the flow of water through a hose or conduit.

The control system used to operate the robot, with its inherent analog reference position monitoring/position feedback system, can also be utilized to continuously vary the pressure of the compressed air supplied to the transvectors, as well as the fiber quantity and fiber velocity of the fibers issuing from the chopper gun, so as to adjust the velocity and quantity of the fiber flow that issues from transvector TV2 as the transvector is moved relative to the workpiece.

Many other variations and modifications may be made in the apparatus and techniques herein before described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

We claim as our invention:

1. A method for the transport of a homogeneous mixture of chopped fibers from chopped fiber generation means to a workpiece, said method comprising the steps of:

providing:

first flow amplification means having an inlet opening and an outlet opening placed in fluid communication with said inlet opening, said inlet opening capable of receiving said chopped fibers from said chopped fiber generation means, said outlet opening capable of discharging said chopped fibers in an accelerated manner therethrough, conduit means having an inlet opening and an outlet opening in fluid communication with aid inlet opening, said inlet opening capable of receiving said chopped fibers from said outlet opening of said first flow amplification means, said outlet opening capable of discharging said chopped fibers therethrough, and second flow amplification means having an inlet opening and an outlet opening placed in fluid communication with said inlet opening, said inlet opening capable of receiving said chopped fibers from said outlet opening of said conduit means, said outlet opening capable of discharging said fibers in an accelerated homogeneous manner therefrom, establishing chopped fiber flow from said chopped fiber generation means sequentially through said first flow amplification means, conduit means and second flow amplification means by providing a compressed air supply means for the supply of compressed air to compressed air openings defined in each of said flow amplification means, and adjusting the pressure of said compressed air supplied to said compressed air openings of said first flow amplification means from about 2 to about 4 times the pressure of said compressed air supplied to said compressed air openings of said second flow amplification means, said chopped fibers flowing in an accelerated homogeneous manner from said outlet of said second flow amplification means toward said workpiece.

2. A method for the transport of a homogeneous mixture of chopped fibers from chopped fiber generation means to a workpiece, said method comprising the steps of:

providing:

first flow amplification means having an inlet opening and an outlet opening placed in fluid communication with said inlet opening, said inlet opening capable of receiving said chopped fibers from said chopped fiber generation means, said outlet opening capable of discharging said chopped fibers in an accelerated manner therethrough, conduit means having an inlet opening and an outlet opening in fluid communication with said inlet opening, said inlet opening capable of receiving said chopped fibers from said outlet opening of said first flow amplification means, said outlet opening capable of discharging said chopped fibers therethrough, and second flow amplification means having an inlet opening and an outlet opening placed in fluid communication with said inlet opening, said inlet opening capable of receiving said chopped fibers from said outlet opening of said conduit means, said outlet opening capable of discharging said fibers in an accelerated homogeneous manner therefrom, establishing chopped fiber flow from said chopped fiber generation means sequentially through said first flow amplification means, conduit means and second flow amplification means by providing a compressed air supply means for the supply of compressed air to compressed air openings defined in each of said flow amplification means, and adjusting the volume of compressed air supplied to said first flow amplification means from about one-fifteenth to about one-fortieth the total air flow through said inlet opening of said second flow amplification means, said chopped fibers flowing in accelerated homogeneous manner from said outlet of said second flow amplification means toward said workpiece.

3. The method of claim 2 wherein the supply of compressed air to compressed air openings in each of said flow amplification means is adjusted so that the pressure of said compressed air supplied to said compressed air openings of said first flow amplification means is from about 2 to about 4 times the pressure of said compressed gas supplied to said compressed air openings of said second flow amplification means.

* * * * *